(12) United States Patent
Wang et al.

(10) Patent No.: US 10,782,409 B2
(45) Date of Patent: Sep. 22, 2020

(54) TECHNOLOGIES FOR LIDAR BASED MOVING OBJECT DETECTION

(71) Applicant: INTEL CORPORATION, Santa Clara, CA (US)

(72) Inventors: Zhigang Wang, Beijing (CN); Bo Zhang, Raleigh, NC (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/578,003

(22) PCT Filed: Dec. 29, 2016

(86) PCT No.: PCT/CN2016/112890
§ 371 (c)(1),
(2) Date: Nov. 29, 2017

(87) PCT Pub. No.: WO2018/119823
PCT Pub. Date: Jul. 5, 2018

(65) Prior Publication Data
US 2019/0377090 A1 Dec. 12, 2019

(51) Int. Cl.
*G01S 17/89* (2020.01)
*G01S 17/08* (2006.01)
*G01S 7/48* (2006.01)

(52) U.S. Cl.
CPC .......... *G01S 17/89* (2013.01); *G01S 7/4808* (2013.01); *G01S 17/08* (2013.01)

(58) Field of Classification Search
CPC ........ G01S 17/08; G01S 7/4808; G01S 17/89; G01S 17/66; G01S 17/023

USPC ....................................................... 356/4.01
See application file for complete search history.

(56) References Cited

U.S. PATENT DOCUMENTS 7,451,005 B2 * 11/2008 Hoffberg ................ G05B 15/02
                                                              700/83
2015/0293225 A1   10/2015 Riley et al.
2016/0292519 A1   10/2016 Templeton et al.

OTHER PUBLICATIONS

International search report for PCT application No. PCT/CN2016/112890, dated Sep. 30, 2017 (4 pages).
Written opinion for PCT application No. PCT/CN2016/112890, dated Sep. 30, 2017 (4 pages).

* cited by examiner

*Primary Examiner* — Daniel L Murphy
(74) *Attorney, Agent, or Firm* — Barnes & Thornburg LLP

(57) ABSTRACT

Technologies for monitoring a movement of one or more objects include an autonomous compute device. The autonomous compute device includes an optical system, for example, a LIDAR system, to capture optical data that may be used to determine a relative position of the one or more objects relative to the autonomous compute device. Based on the optical data captured at one point in time and an indication of how much the autonomous compute device has moved, the autonomous compute device may predict where an object will be relative to the autonomous compute device at a later point in time. Based on optical data captured at the later point in time, the autonomous compute device may determine whether the position of the object has been changed and further analyze the changes to monitor the movement of the object.

22 Claims, 6 Drawing Sheets

TECHNOLOGIES FOR LIDAR BASED MOVING OBJECT DETECTION

BACKGROUND

Various object-detection systems and techniques exist. Light Detection and Ranging (LIDAR) is an optical remote sensing technology capable of measuring a distance to, or other properties of, an object, by illuminating the object with a pulse of light in the ultraviolet, visible, or near infrared spectrum from a light source (e.g., a laser). The LIDAR can collect depth information in different directions. The LIDAR can collect depth information in different directions. The LIDAR based Simultaneous Localization and Mapping (SLAM) is widely used to provide a map and location for autonomous compute devices. An object-detection method, which is similar to an image-based method, was developed for LIDAR that is configured to compare a continuous map, pixel by pixel, for the detection of moving objects. While such an object-detection method is workable for the high accuracy LIDAR, it is considerably more computationally expensive to implement. For lower cost LIDAR, that object-detection method may be stable and many include various random errors that cause static objects to be detected as moving objects.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
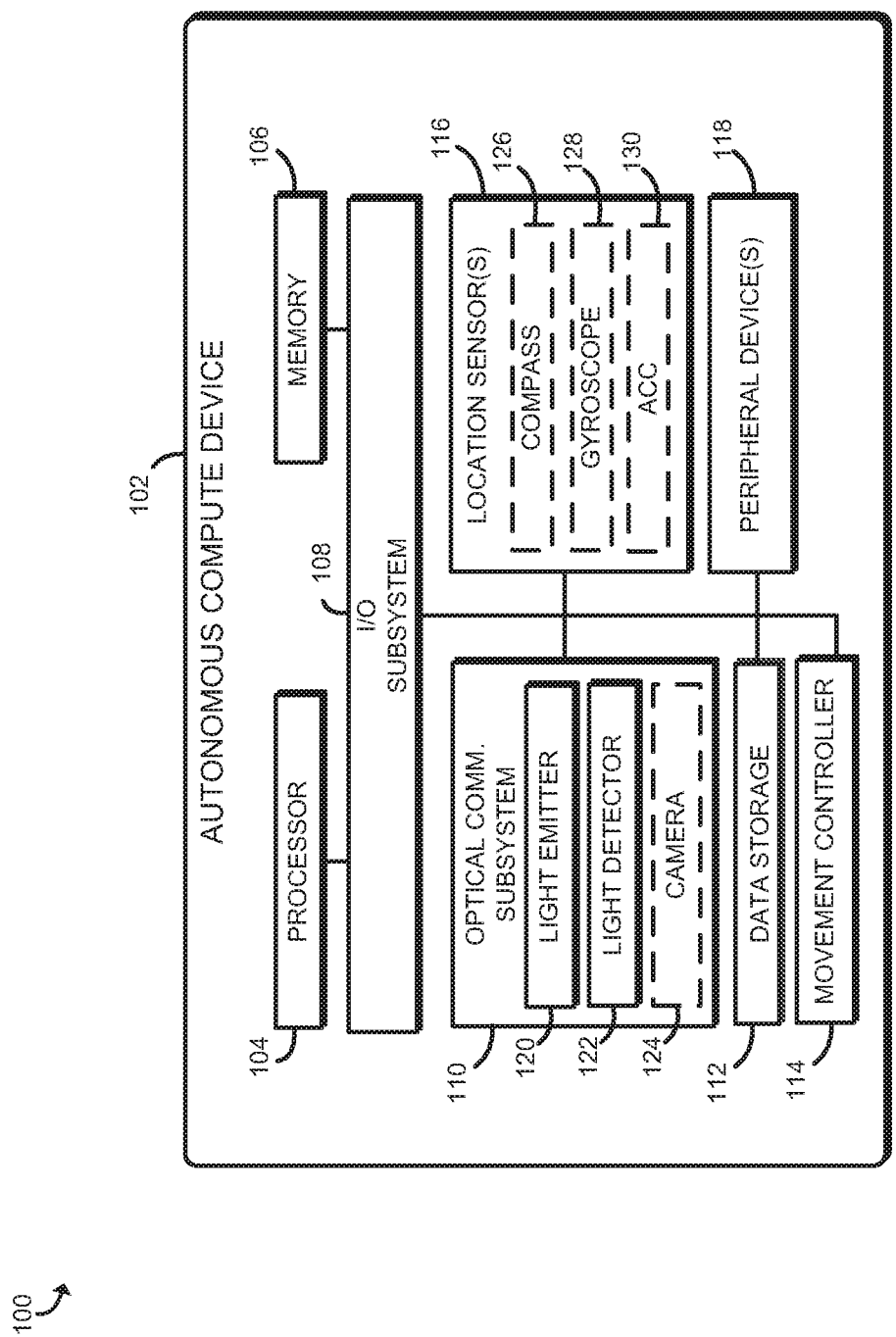
FIG. 1 is a simplified block diagram of at least one embodiment of an autonomous compute device for monitoring movement of one or more objects.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for monitoring a movement of one or more objects includes an autonomous compute device 102. The autonomous compute device 102 is configured to continually, periodically, or responsively gather optical data using an optical communication subsystem 110. For example, in the illustrative embodiment, the optical communication subsystem 110 may be embodied as a light detection and ranging (LIDAR) system. The LIDAR system is configured to capture the optical data that may include a relative position of one or more objects relative to the autonomous compute device 102, which can be used to build a depth image of an environment surrounding the autonomous compute device 102, Based on the optical data captured at one point in time and an indication of how much the autonomous compute device 102 has moved, the autonomous compute device 102 can predict where an object will be relative to the autonomous compute device 102 at a later point in time. Based on optical data captured at the later point in time, the autonomous compute device 102 may determine whether the position of the object has been changed and further analyze the changes to monitor the movement of the object.

In an illustrative embodiment, the autonomous compute device 102 may be embodied as any type of autonomous home service device. For example, the autonomous home service device 102 may be an autonomous vacuum robot. In such an embodiment, the autonomous vacuum robot 102 includes the LIDAR system to monitor one or more moving objects in a room while travelling within the room. In some embodiments, the autonomous vacuum robot 102 may predict the next location of the moving object based on previous movement pattern.

As shown in FIG. 1, the illustrative autonomous compute device 102 includes a processor 104, a memory 106, an input/output (I/O) subsystem 108, an optical communication subsystem 110, a data storage 112, a movement controller 114, and one or more location sensors 116. Of course, the autonomous compute device 102 may include other or additional components, such as those commonly found in a typical compute device (e.g., various input/output devices and/or other components), in other embodiments. Additionally, in some embodiments, one or more of the illustrative components may be incorporated in, or otherwise form a portion of, another component. For example, the memory 106, or portions thereof, may be incorporated in the processor 104 in some embodiments.

The processor 104 may be embodied as any type of processor capable of performing the functions described herein. For example, the processor 104 may be embodied as a single or multi-core processor(s), digital signal processor, microcontroller, or other processor or processing/controlling circuit. Similarly, the memory 106 may be embodied as any type of volatile or non-volatile memory or data storage capable of performing the functions described herein. In operation, the memory 106 may store various data and software used during operation of the autonomous compute device 102 such as applications, programs, libraries, and drivers. The memory 106 is communicatively coupled to the processor 104 via the I/O subsystem 108, which may be embodied as circuitry and/or components to facilitate input/output operations with the processor 104, the memory 106, and other components of the autonomous compute device 102. For example, the I/O subsystem 108 may be embodied as, or otherwise include, memory controller hubs, input/output control hubs, firmware devices, communication links (i.e., point-to-point links, bus links, wires, cables, light guides, printed circuit board traces, etc. and/or other components and subsystems to facilitate the input/output operations. In some embodiments, the I/O subsystem 108 may form a portion of a system-on-a-chip (SoC) and be incorporated, along with the processor 104, the memory 106, and other components of the autonomous compute device 102, on a single integrated circuit chip.

The optical communication subsystem 110 is configured to capture the optical data of one or more objects within the environment surrounding the autonomous compute device 102. As discussed above, in the illustrative embodiment, the optical communication subsystem 110 may be embodied as a LIDAR system. The optical data may include, or otherwise be indicative of, the position of the one or more objects relative to the autonomous compute device 102 and may be embodied as, for example, a depth image of the environment surrounding the autonomous compute device 102 at a current location. In order to determine the relative position information, the optical communication subsystem 110 includes a light emitter 120 and a light detector 122. The light emitter 120 is configured to emit radiation such as a laser beam at one or more wavelengths, such as a near-infrared, visible, or near-ultraviolet (UV) wavelength. In some embodiments, the light emitter 120 may scan the environment surrounding the autonomous compute device 102 with the laser beam. In some embodiments, the light emitter 120 may directly project the laser beam toward a particular direction. The light detector 122 is configured to detect a scattered laser beam reflecting off of the object, and measure a depth from the autonomous compute device 102 to the object. In some embodiments, the light detector 122 may be embodied as a camera that is sensitive to the particular wavelength used for the light emitter 120, and may include one or more filters to block out background light. When the light emitter 120 scans the environment surrounding the autonomous compute device 102 with the laser beam, the light detector 122 captures the scattered laser beam to generate a depth image of the environment surrounding the optical communication subsystem 110 at a current location of the autonomous compute device 102. Additionally, when the light emitter 120 directly projects the laser beam toward a particular direction, the light detector 122 detects the scattered laser beam to determine the depth between the nearest object in that direction and the autonomous compute device 102. The light emitter 120 may either scan in one dimension (such as in a line or may scan in two dimensions (such as in a grid pattern).

In some embodiments, the optical communication subsystem 110 may further include a camera 124. The camera 124, in conjunction with the light emitter 120, is configured to measure the depth from the autonomous compute device 102 to the object. For example, in some embodiments, the light emitter 120 emits the laser beam in one direction, and the camera 124 is configured to capture an image at the direction where the laser beam is emitted. In such embodiment, the optical communication subsystem 110 may calculate the depth or distance of the object from the autonomous compute device 102 by analyzing the captured image to determine where the laser hits the object.

The data storage 112 may be embodied as any type of device or devices configured for short-term or long-term storage of data such as, for example, memory devices and circuits, memory cards, hard disk drives, solid-state drives, or other data storage devices. In some embodiments, the data storage 112 may form a portion of the memory 106. In the illustrative embodiment, the optical communication subsystem 110 may be configured to store absolute locations of the compute device, absolute locations of the object, and/or depth images taken at different time in the data storage 112.

The movement controller 114 is configured to control movement of the autonomous compute device 102, such as by controlling an electric motor coupled to wheels of the autonomous compute device. As such, the optical communication subsystem 110 is capable of monitoring changes in the environment surrounding the autonomous compute device 102 while the autonomous compute device 102 is continuously, continually, or periodically moving.

The one or more location sensors 116 are configured to determine an absolute and/or relative location of the autonomous compute device 102. The location sensor(s) 116 may be embodied as any type of sensor, circuit, or component capable of determining the present location of the autonomous compute device 102, capable of producing sensor data from which the location may be determined, and/or capable of generating sensor data indicative of the orientation (e.g., three-dimensional orientation or position) of the autonomous compute device 102. For example, the location sensor(s) 115 may be embodied as, or otherwise include, a compass 126, a gyroscope 128, and/or an accelerometer (ACC) 130. In some embodiments, the orientation of the autonomous compute device 102 may be used to determine the relative angle between the autonomous compute device 102 and the object. Additionally, in sonic embodiments, one or more location sensors 116 may be embodied as a Global Positioning Sensor (GPS) circuit configured to determine a location of the autonomous compute device 102 or as another communication circuit capable of receiving signals from which the autonomous compute device 102 can determine its present location. Of course, the location of the autonomous compute device 102 can be determined in other manners in yet further embodiments.

Figure 2:
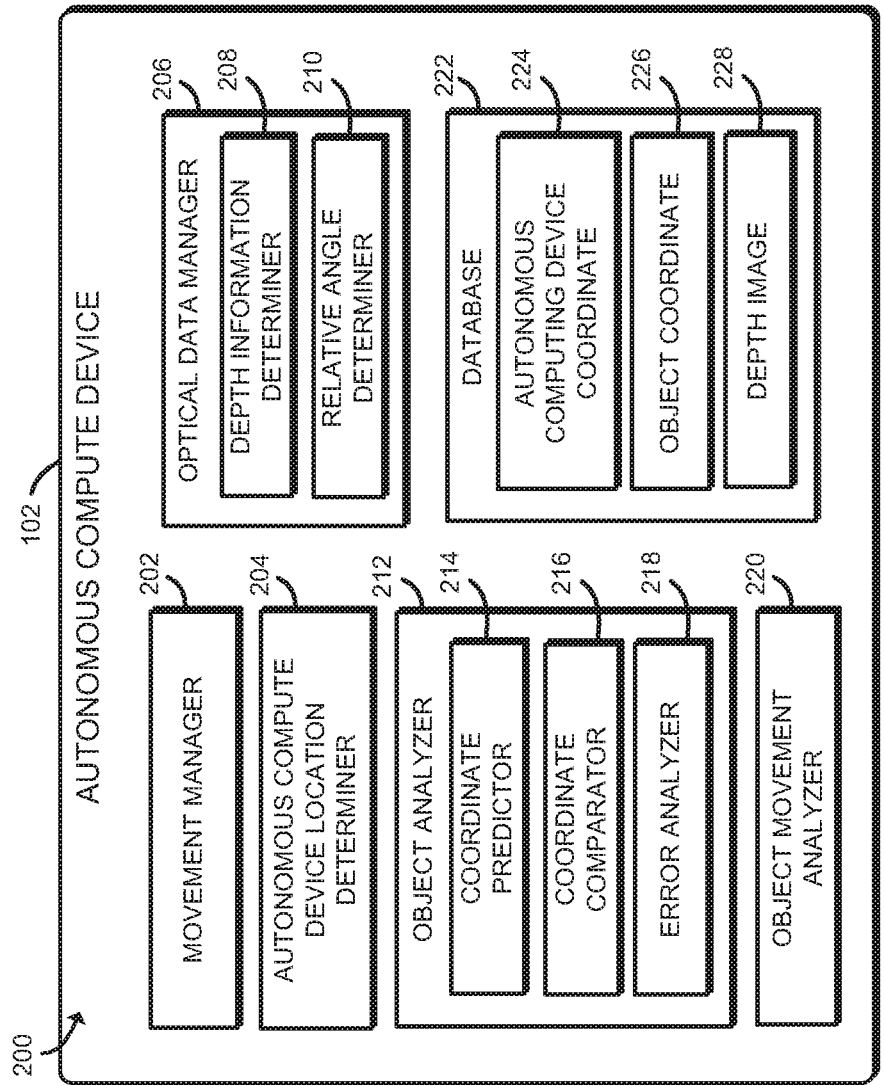
FIG. 2 is a simplified block diagram of at least one embodiment of an environment that may be established by the autonomous compute device of the system of FIG. 1.

Referring now to FIG. 2, in use, the autonomous compute device 102 establishes an environment 200. The illustrative environment 200 includes an autonomous compute device movement manager 202, an autonomous compute device location determiner 204, an object analyzer 212, an object movement analyzer 220, an optical data manager 206, and a database 222. The various components of the environment 200 may be embodied as hardware, firmware, software, or a combination thereof. As such, in sonic embodiments, one or more of the components of the environment 200 may be embodied as circuitry or collection of electrical devices (e.g., an movement manager circuit 202, an autonomous compute device location determiner circuit 204, an object analyzer circuit 212, an object movement analyzer circuit 220, and an optical data manager circuit 206, etc.). It should be appreciated that, in such embodiments, the movement manager circuit 202, the autonomous compute device location determiner circuit 204, the object analyzer circuit 212, the object movement analyzer circuit 220, and/or the optical data manager circuit 206 may form a portion of one or more of the processor 104, the I/O subsystem 108, the optical communication subsystem 110, and/or other components of the autonomous compute device 102. Additionally, in some embodiments, one or more of the illustrative components of the environment 200 may form a portion of another component and/or one or more of the illustrative components may be independent of one another.

The movement manager 202 is configured to manage the movement of the autonomous compute device 102. To do so, the movement manager 202 manages the movement characteristics, such as a moving time period, a frequency of the movement, a direction of the movement, a speed at which the autonomous compute device 102 is travelling, or other movement characteristics. The movement manager 202 is further configured to record the location (including position and orientation) of the autonomous compute device 102 so that the location of the autonomous compute device 102 is known when comparing depth images taken at different times and locations.

The autonomous compute device location determiner 204 is configured to determine an absolute location of the autonomous compute device 102 in the given environment. In some embodiments, the autonomous compute device location determiner 204 determines the absolute location of the autonomous compute device 102 based on the movement characteristics of the autonomous compute device 102. For example, the autonomous compute device location determiner 204 determines how far the autonomous compute device 102 has moved based on how fast the autonomous compute device 102 was moving in which direction for how long since the last determined absolute location of the autonomous compute device 102. As will he discussed in detail below, in some embodiments, the autonomous compute device location determiner 204 may determine the absolute location of the autonomous compute device 102 by analyzing the depth image of the environment surrounding the autonomous compute device 102. It should be appreciated that, as used herein, location refers to both a position and an orientation.

The optical data manager 206 is configured to receive the optical data of one or more objects. In the illustrative embodiment, the optical data manager 206 includes a depth information determiner 208 and a relative angle determiner 210. The depth information determiner 208 is configured to determine a depth or distance between the object and the autonomous compute device 102. The relative angle determiner 210 is configured to determine a relative angle of the object relative to the autonomous compute device 102. Based on the depth and the relative angle of the object, the optical data manager 206 may determine a relative position of the object relative to the autonomous compute device 102.

The object analyzer 212 is configured to analyze the optical data and determine an absolute location of the object based on the optical data and the absolute location of the autonomous compute device 102. To do so, the object analyzer 212 includes a coordinate predictor 214, a coordinate comparator 216, and an error analyzer 218. The coordinate predictor 214 is configured to predict a current coordinate of the object based on the previous location of the object, the previous location of the autonomous compute device 102, and the movement characteristics of the autonomous compute device 102. Alternatively, the coordinate predictor 214 may predict the present coordinate of the object based on the optical data from the previous location of the autonomous compute device and depth images from present and previous locations of the autonomous compute device 102. Using the predicted current coordinate of the object, the coordinate comparator 216 checks a current depth image for an object at the predicted current coordinate of the object. The object analyzer 214 is further configured to determine a difference between the present and previous coordinates of the object, The error analyzer 218 is configured to determine whether the difference is within a reference threshold. If the difference is outside of the reference threshold, the error analyzer 218 further analyzes movement characteristic of the object. In some embodiments, the error analyzer 218 may be configured to perform a self-calibration. To do so, the error analyzer 218 may determine a distribution of measured changes in location for the one or more objects. Even if most of the objects did not actually move, there will be a distribution of measured changes in location of the one or more objects since the determination of the locations is not perfect. The error analyzer 218 may consider any point that is within the distribution (e.g., within 1, 2, 3, 4 or 5 standard deviations of the center of the distribution) not to have moved.

The object movement analyzer 220 is configured to analyze multiple coordinates of the object to determine the movement characteristics of the object. Similar to the movement characteristic of the autonomous compute device 102, the movement characteristics of the object may include, for example, a moving time period, a frequency of the movement, a direction of the movement, a speed at which the autonomous compute device 102 is travelling, or other movement characteristics. To determine the movement characteristics, the object movement analyzer 220 may aggregate multiple coordinates of the object to analyze or monitor the movement of the object. In some embodiments, the object movement analyzer 220 may predict the next location of the moving object based on the previous movement characteristics.

The database 222 is configured to store various data of the autonomous compute device 102. In the illustrative embodiment, the database 222 includes an autonomous compute device coordinate 224, an object coordinate 226, and a depth image 228. As discussed above, the autonomous compute device coordinate 224 may include a present coordinate and one or more previous coordinates of the autonomous compute device 102. Similarly, the object coordinate 226 may include a present coordinate and one or more previous coordinates of the object. The depth image 228 may include a present depth image and one or more previous depth images of the environment surrounding the autonomous compute device 102.

Figure 3:
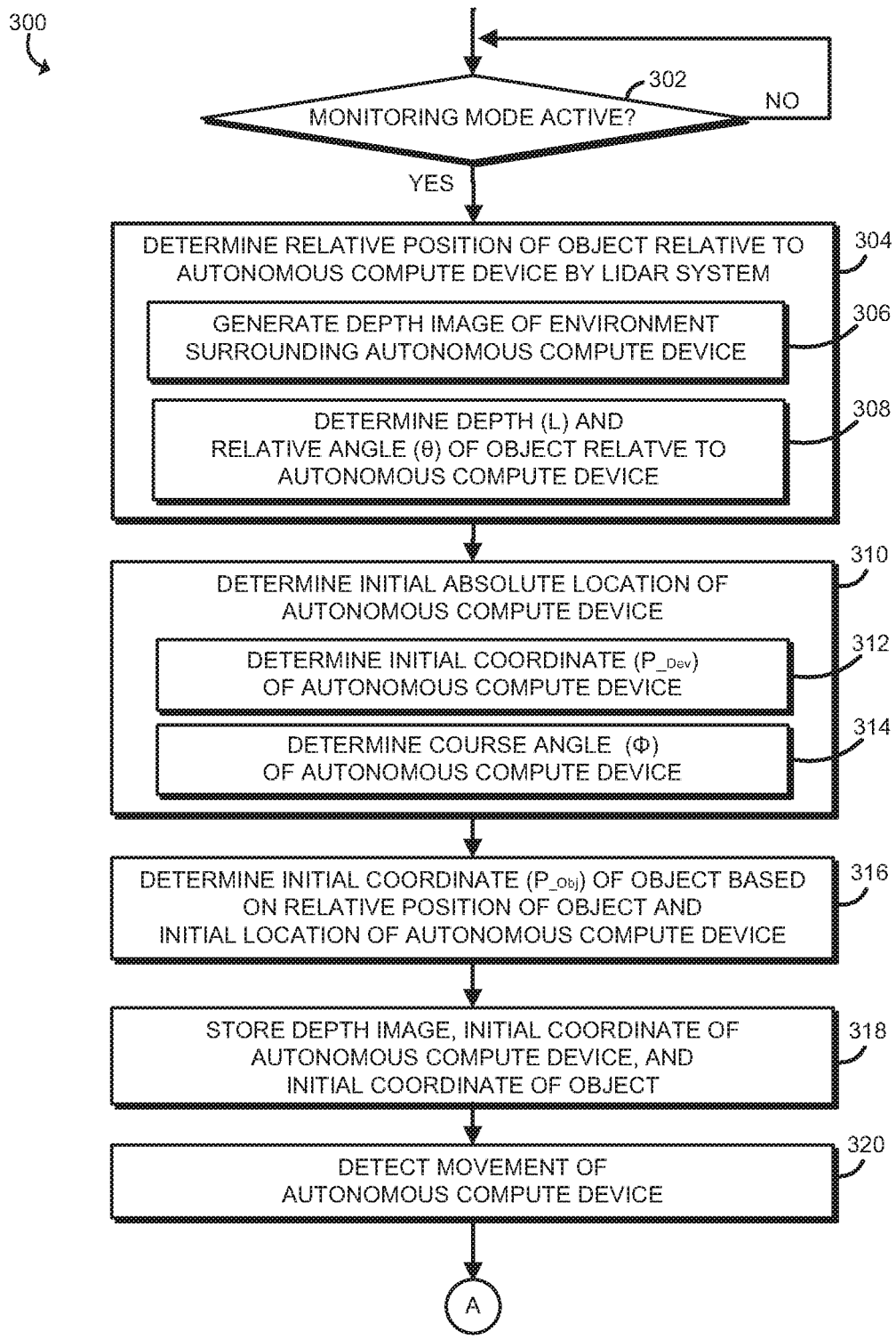
FIGS. 3-5 are a simplified flow diagram of at least one embodiment of a method for moving object detection that may be executed by the autonomous compute device of the system of FIGS. 1 and 2.
Figure 4:
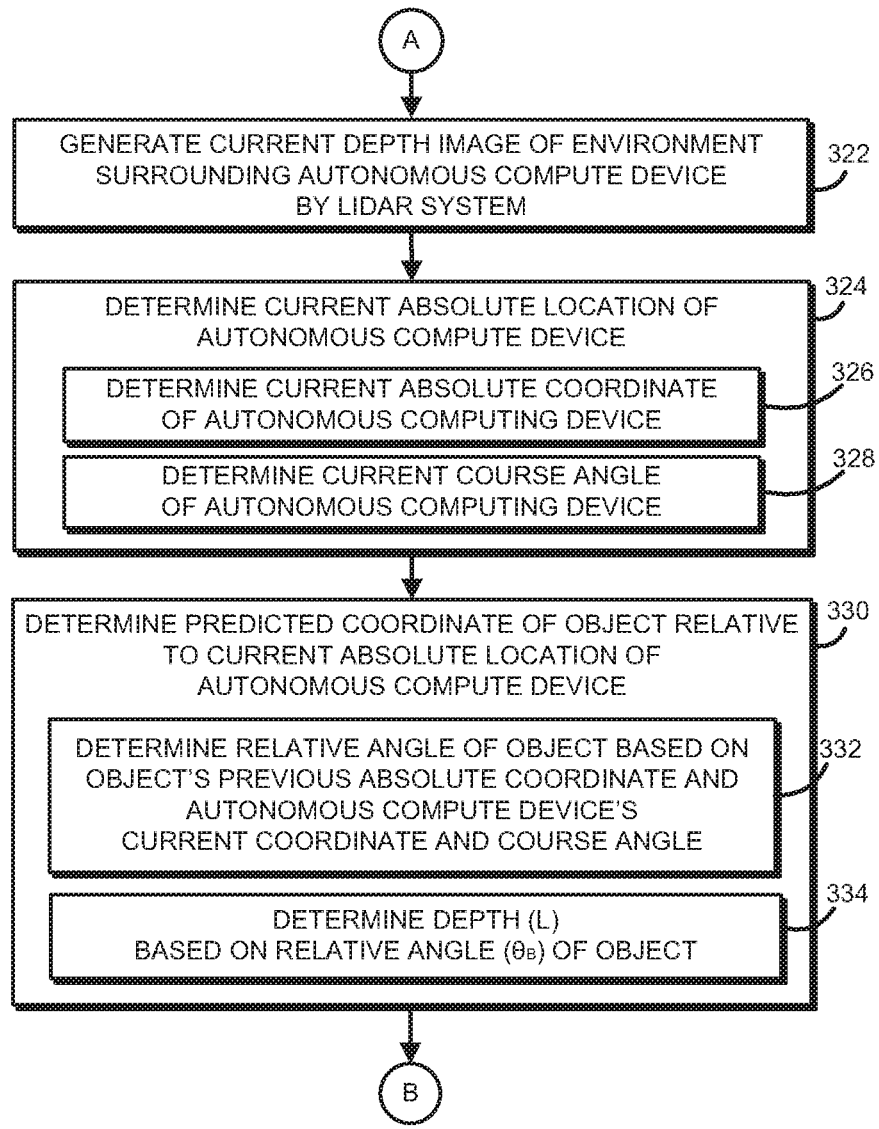
Figure 5:
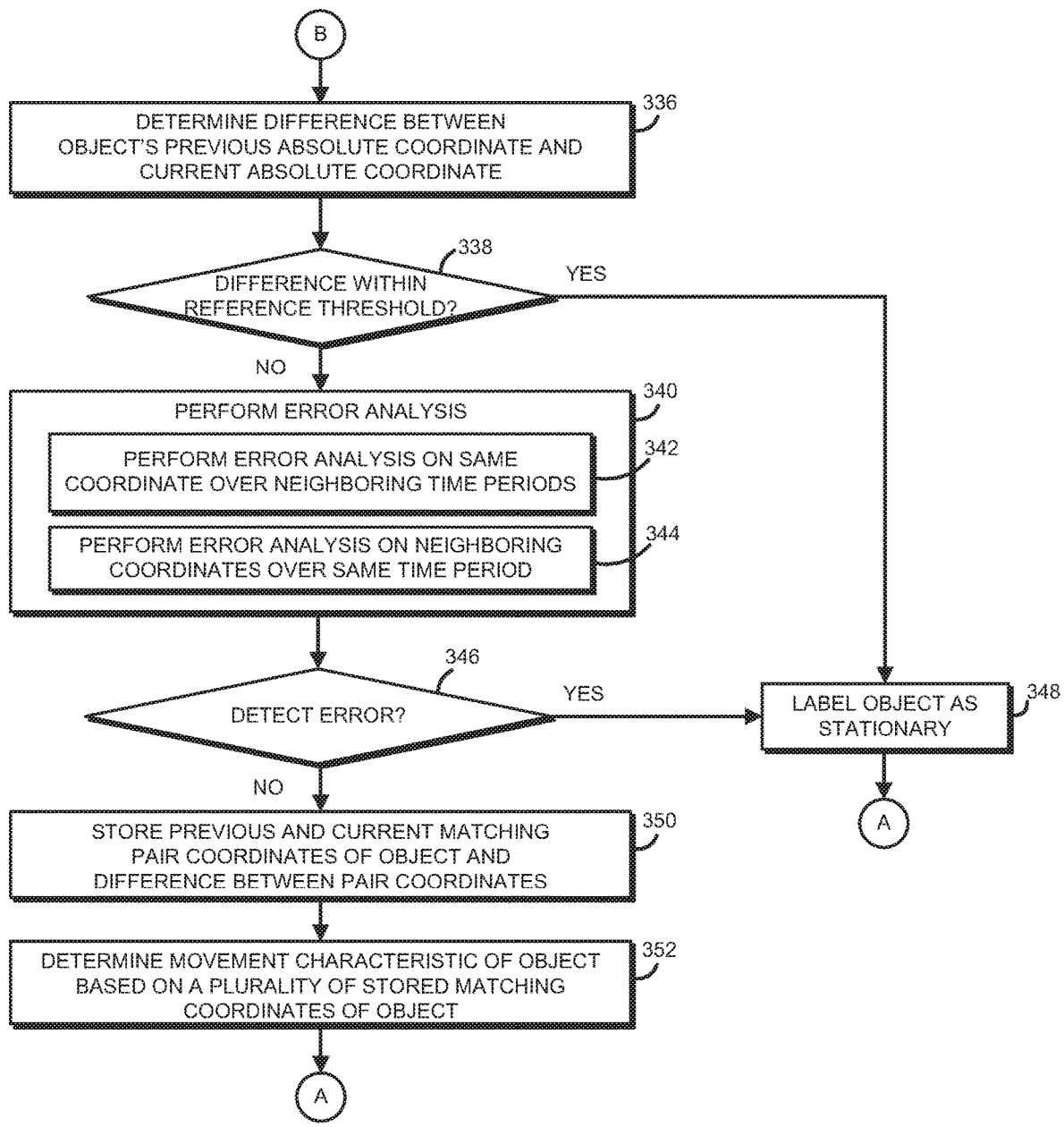

Referring now to FIGS. 3-5, in use, the autonomous compute device 102 may execute a method 300 for monitoring the movement of one or more objects relative to the autonomous compute device 102. The method 300 begins with block 302 in which the autonomous compute device 102 determines whether a monitoring mode of the autonomous compute device 102 is active. The monitoring mode may be automatically or manually set to active. In some embodiments, the monitoring mode becomes automatically active when the autonomous compute device 102 is turned on. In other embodiments, a user of the autonomous compute device 102 may manually set the monitoring mode active. If the monitoring mode is not active, the method 300 remains in block 302 until the monitoring mode becomes active. When the monitoring mode of the autonomous compute device 102 becomes active, the method 300 advances to block 304.

In block 304, the autonomous compute device 102 determines the relative position of one or more objects relative to the autonomous compute device 102 based on the optical data. As discussed above, the optical data may include the depth (L) from the autonomous compute device 102. to the one or more objects and the relative angle (θ) of the object relative to the autonomous compute device 102. In the illustrative embodiment, the depth information (L) and the relative angle (θ) are captured and measured by the LIDAR system 110. The LIDAR system 110 may aggregate the optical data to generate a depth image of the environment surrounding the autonomous compute device 102 in block 306. The LIDAR system 110 further determines the depth information (L) and the relative angle (θ) of the one or more objects relative to the autonomous compute device 102 in block 308.

After determining the optical data, the method 300 proceeds to block 310. In block 310, the autonomous compute device 102 determines an initial absolute location of the autonomous compute device 102. To determine the initial absolute location of the autonomous compute device 102 in the given environment, the autonomous compute device 102 determines an initial absolute coordinate of the autonomous compute device 102 ($P_{Dev}$) in the given environment in block 312 and determines a course angle (Φ) of the autonomous compute device 102 in block 314. The course angle (Φ) indicates a direction of a movement of the autonomous compute device 102. In some embodiments, the location of the autonomous compute device 102 may be determined based on the optical data and the depth image generated by the LIDAR system 110. After determining the initial absolute location of the autonomous compute device 102, the method 300 proceeds to block 316.

In block 316, the autonomous compute device 102 determines an initial absolute coordinate of the object in the given environment based on the optical data and the initial absolute location of the autonomous compute device 102. After determining the initial absolute coordinate of the object, the autonomous compute device 102 stores the coordinate of the autonomous compute device 102, the depth image of the environment surrounding of the autonomous compute device 102 from the initial absolute location of the autonomous compute device 102, and the initial absolute coordinate of the object in block 318.

The autonomous compute device 102 subsequently monitors for movement of the autonomous compute device 102 in block 320. For example, the autonomous compute device 102 may have changed the location of the autonomous compute device 102 and/or the direction where the autonomous compute device 102 is moving towards. If the autonomous compute device 102 detects the movement, the autonomous compute device 102 proceeds to block 322 of FIG. 4. However, it should be appreciated that, in some embodiment, the autonomous compute device 102 proceeds to block 322 after a predefined time period subsequent to storing the depth image and the initial absolute coordinates of the autonomous compute device 102 and the object in block 318.

Referring now to FIG. 4, in block 322, the autonomous compute device 102 generates a current depth image of the environment surrounding the autonomous compute device 102 taken from a current location and orientation of the autonomous compute device 102 by the LIDAR system 110. As discussed above, the autonomous compute device 102 may have changed position and/or orientation. In block 324, the autonomous compute device 102 determines a current absolute location of the autonomous compute device 102. To do so, the autonomous compute device 102 determines a current absolute coordinate of the autonomous compute device 102 in block 326 and a current course angle of the autonomous compute device 102 in block 328. In some embodiments, the current location of the autonomous compute device 102 may be determined based on the previously determined absolute location of the autonomous compute device 102 and the sensor data indicating a displacement and rotation of the autonomous compute device 102. Alternatively, the current absolute location of the autonomous compute device 102 may be determined based on the current depth image generated by the LIDAR system 110.

After determining the current absolute location of the autonomous compute device 102, the method 300 proceeds to block 330 in which the autonomous compute device 102 determines a predicted coordinate of the object relative to the current absolute location of the autonomous compute device 102. To do so, the autonomous compute device 102 determines a relative angle of the object relative to the current absolute location of the autonomous compute device 102 in block 332. Specifically, the autonomous compute device 102 determines the relative angle of the object based on the previously determined absolute coordinate of the object, the current absolute coordinate of the autonomous compute device 102, and the course angle of the autonomous compute device 102. The autonomous compute device 102 further determines a depth (L) of the object relative to the current absolute location of the autonomous compute device 102 in block 334.

Alternatively, in some embodiments, the autonomous compute device 102 may compare the depth images taken from the previous and current absolute locations of the autonomous compute device 102 to predict the predicted absolute coordinate of the object relative to the current absolute location of the autonomous compute device 102 in block 330.

After determining the predicted coordinate of the object, the method 300 advances to block 336 of FIG. 5, in which the autonomous compute device 102 compares the previous and current absolute coordinates of the object to determine a difference between those coordinates via the object analyzer 214. To do so, the autonomous compute device 102 determines one or more directions that were scanned in the current depth image that most closely align with the predicted direction of the object relative to the autonomous compute device 102 in the current location and determines a distance to an object at the determined one or more directions. By comparing the measured distance to an object in the predicted direction to the predicted distance, the autonomous compute device 102 can determine a measured change in position of the object between the previous time and the current time.

Once the difference in the previous and current coordinates is determined, the method 300 proceeds to block 338 in which the object analyzer 214 determines whether the difference is within a reference threshold. If the object analyzer 214 determines that the difference is within the reference threshold, the method 300 advances to block 348 in which the autonomous compute device 102 labels the object as being stationary. If, however, the object analyzer 214 determines that the difference is not within the reference threshold, the autonomous compute device 102 advances to block 340. The value for the reference threshold may be determined through a self-calibration of the autonomous compute device 102, as described above in more detail.

In block 340, the autonomous compute device 102 performs an error analysis to ensure the object is not stationary via the error analyzer 218. That is, if the difference is between the previous and present coordinates of the object is greater than the threshold, the autonomous compute device 102 may perform certain analyses to determine whether the object has actually moved. For example, the autonomous compute device 102 may perform an error analysis on the same coordinate of the object over neighboring time periods in block 342. For example, the autonomous compute device 102 may repeat blocks 322-336 over longer time periods to determine whether a new predicted coordinate of the object returns back to the previous coordinate, remains the same, or further changes or moves away from the previous coordinate. If the new predicted coordinate returns back to the previous coordinate, the autonomous compute device 102 determines that there was an error in determining the current predicted coordinate of the object. In such case, the autonomous compute device 102 determines that the error has been detected in block 346 and advances to block 348 in which the autonomous compute device 102 determines that the object is stationary and loops back to block 322. If, however, the new predicted coordinate of the object remains the same or further changes, the autonomous compute device 102 determines that no error has been detected in block 346, and the method 300 advances to block 348, which is discussed in detail below.

Contemporaneously or alternatively, the autonomous compute device 102 may perform an error analysis on neighboring coordinates over the same time period using the stored depth images in block 344. In reality, the object includes multiple coordinates that define the object. By analyzing the neighboring coordinates, the autonomous compute device 102 may further determine whether any of the neighboring coordinates, which are likely to be associated with the same object, have changed. If the neighboring coordinates remain the same, the determined difference may be a result of an error.

In block 350, the autonomous compute device 102 stores the previous and current coordinates of the moving object and the difference between that pair of coordinates. In the illustrative embodiment, the matching coordinates of the object may be used to determine a movement characteristic of the object in block 352. For example, the autonomous compute device 102 may aggregate the matching coordinates of the objects stored in the data storage 112 to monitor the changes in the movement of the object over some time period. The method 300 then loops back to block 322.

Figure 6:
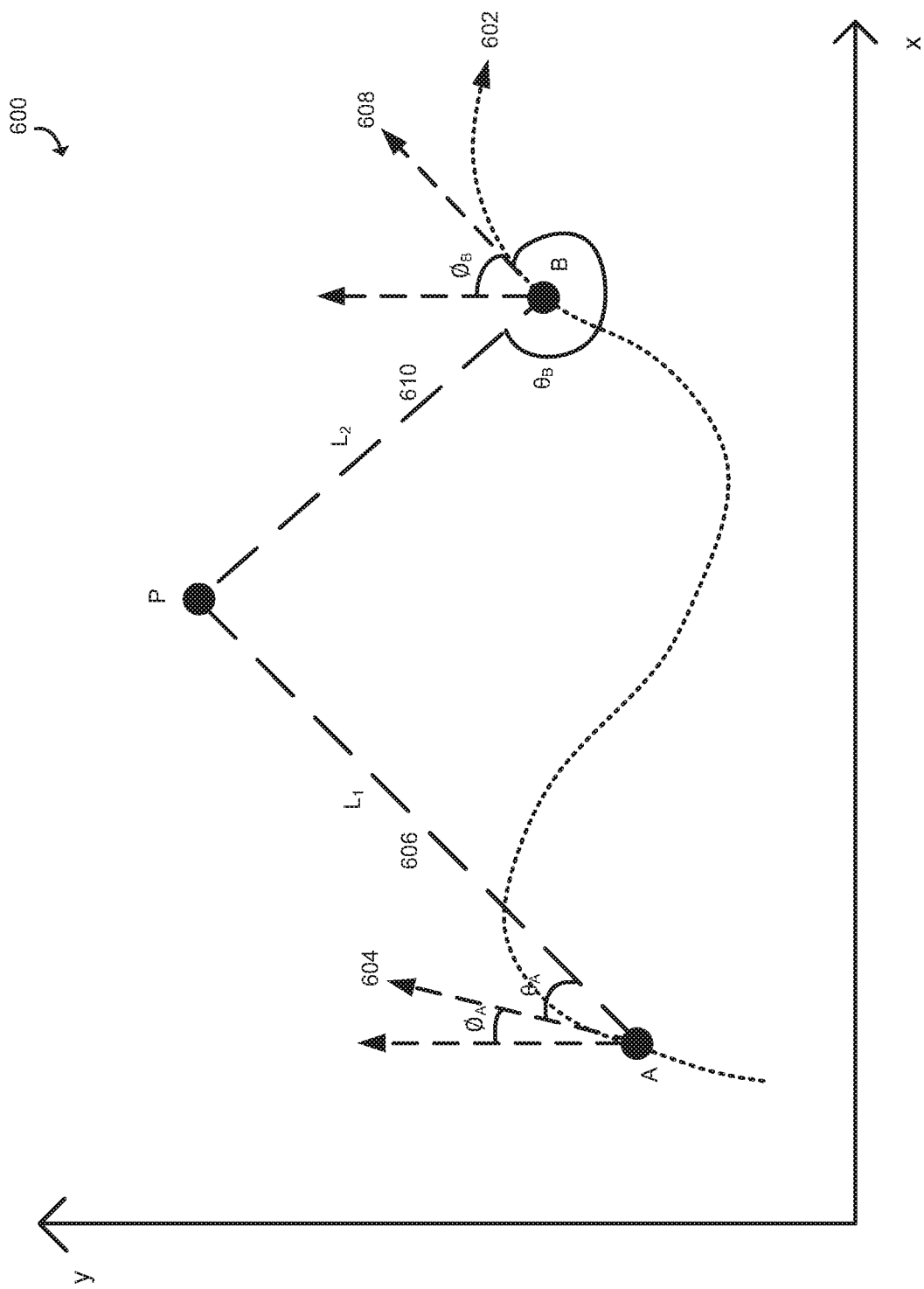
FIG. 6 is a graph that illustrates a position of an object relative to the autonomous compute device of FIGS. 1 and 2 at different location coordinates.

Referring now to FIG. 6, a graph 600 illustrates a trend line 602 representing a movement of the autonomous compute device 102 over time. Point A and Point B denote absolute locations of the autonomous compute device 102. At time 1 ($t_1$), the autonomous compute device 102 is at the Point A coordinates, $P_{A,t1}(X_{A,t1}, Y_{A,t1})$ and is facing along a trend line 604 defining a course angle ($\emptyset_A$). In the illustrative embodiment, the LIDAR system 110 emits the laser beam at a direction angle ($\theta_A$) along a trend line 606, captures the object P positioned along the trend line 606, and determine the depth ($L_1$) of the object relative to the autonomous compute device 102. As discussed in detail above, the autonomous compute device 102 determines the absolute coordinate of the object P at $t_1$ based on the Point A coordinates, $P_{A,t1}(X_{A,t1}, Y_{A,t1})$ of the autonomous compute device 102, the direction angle ($\theta_A$) and the depth ($L_1$) of the object P relative to the Point A. For example, the absolute coordinate of object P at $t_1$ is $P_{1,t1}(X_{1,t1}, Y_{1,t1})$, where $$X_{1,t1} = X_{A,t1} + L_1 \sin(\emptyset_A + \theta_1) \quad (1)$$

$$Y_{1,t1} = Y_{A,t1} + L_1 \cos(\emptyset_A + \theta_1) \quad (2)$$

At time 2 ($t_2$), the autonomous compute device 102 has moved along the trend line 602 to Point B. At time 2 ($t_2$), the autonomous compute device 102 is at the Point B coordinates, $P_{B,t2}(X_{B,t2}, Y_{B,t2})$ and is facing along a trend line 608 defining a course angle ($\emptyset_B$). As discussed in detail above, the predicted direction angle ($\theta_B$) of the object relative to the autonomous compute device 102 at Point B is determined using the Point B coordinates, the course angle ($\emptyset_B$), and the direction angle ($\theta_A$) and the depth ($L_1$) of the object P previously determine at $t_1$. Based on the direction angle ($\theta_B$) of the object at $t_2$, a depth ($L_2$) of the object P relative to the autonomous compute device 102 at Point B can be predicted. Using the course angle ($\emptyset_B$), the direction angle ($\theta_B$), a depth ($L_2$) of the object P at $t_2$, the autonomous compute device 102 may predict a matching coordinate of the object P at $t_2$. The predicted coordinate of object P at $t_2$ is $P_{1,t2}(X_{1,t2}, Y_{1,t2})$, where $$X_{1,t2} = X_{B,t2} + L_2 \sin(\emptyset_B + \theta_2) \quad (3)$$

$$Y_{1,t2} = Y_{B,t2} + L_2 \cos(\emptyset_B + \theta_2) \quad (4)$$

EXAMPLES

Illustrative examples of the technologies disclosed herein are provided below. An embodiment of the technologies may include any one or more, and any combination of, the examples described below.

Example 1 includes an autonomous compute device to monitor a movement of an object, the autonomous compute device comprising an optical communication system to capture first optical data while the autonomous compute device is at a first location and second optical data while the autonomous compute device is at a second location; a movement manager to move the autonomous compute device from the first location to the second location different from the first location; and an object analyzer to determine a first relative position of an object relative to the autonomous compute device at the first location based on the first optical data; determine a predicted second relative position of the object relative to the autonomous compute device at the second location; and determine whether the object is at the predicted second relative position based on the second optical data.

Example 2 includes the subject matter of Example 1, and wherein the optical communication system is a light detection and ranging (LIDAR) system.

Example 3 includes the subject matter of any of Examples 1 and 2, and wherein the first optical data and second optical data include at least one of a depth image of an environment surrounding the autonomous compute device, a depth of the object relative to the autonomous compute device, and a direction angle of the object relative to the autonomous compute device.

Example 4 includes the subject matter of any of Examples 1-3, and wherein to move to the second location comprises to move the autonomous compute device in a direction of a course angle of autonomous compute device, wherein the course angle is indicative of a direction of a movement of the autonomous compute device.

Example 5 includes the subject matter of any of Examples 1-4, and further including an autonomous compute device location determiner to determine the first location of the autonomous compute device based on a depth image of the environment surrounding the autonomous compute device generated by the optical communication system.

Example 6 includes the subject matter of any of Examples 1-5, and further including an autonomous compute device location determiner to determine the first location of the autonomous compute device based on location sensor data received from one or more location sensors.

Example 7 includes the subject matter of any of Examples 1-6, and further including an autonomous compute device location determiner to determine the second location of the autonomous compute device based on a depth image of the environment surrounding the autonomous compute device generated by the optical communication system.

Example 8 includes the subject matter of any of Examples 1-7, and further including an autonomous compute device location determiner to determine the second location of the autonomous compute device based on location sensor data received from one or more location sensors.

Example 9 includes the subject matter of any of Examples 1-8, and wherein to determine whether the object is at the predicted second relative position comprises to determine a difference between the first relative position and the second relative position of the object; and determine whether the difference is within a reference threshold.

Example 10 includes the subject matter of any of Examples 1-9, and wherein the autonomous compute device is further to perform at least one error analysis to ensure that the object has moved.

Example 11 includes the subject matter of any of Examples 1-10, and wherein to perform the at least one error analysis comprises to determine whether a second object is near the predicted second relative position based on the second optical data.

Example 12 includes the subject matter of any of Examples 1-11, and wherein to perform the at least one error analysis comprises to capture third optical data while the autonomous compute device is at a third location; determine a predicted third relative position of the object relative to the autonomous compute device at the third location; and determine whether the object is at the third relative position based on the third optical data.

Example 13 includes the subject matter of any of Examples 1-12, and wherein the autonomous compute device is further to determine at least one movement characteristic of the object based on one or more the relative positions of the object over a predefined time period.

Example 14 includes the subject matter of any of Examples 1-13, and wherein the movement characteristic includes a speed at which the object is moving, a period indicating how long the object has been moving or moved, a frequency of the movement, a direction of the movement.

Example 15 includes a method for monitoring a movement of an object with an autonomous compute device, the method comprising capturing, by an optical communication system of the autonomous compute device, first optical data while the autonomous compute device is at a first location; determining, by the autonomous compute device, a first relative position of an object relative to the autonomous compute device at the first location based on the first optical data; moving, by the autonomous compute device, to a second location different from the first location; capturing, by the optical communication system of the autonomous compute device, second optical data while the autonomous compute device is at the second location; determining, by the autonomous compute device, a predicted second relative position of the object relative to the autonomous compute device at the second location; and determining, by the autonomous compute device, whether the object is at the predicted second relative position based on the second optical data.

Example 16 includes the subject matter of Example 15, and wherein the optical communication system is a light detection and ranging (LIDAR) system.

Example 17 includes the subject matter of any of Examples 15 and 16, and wherein the first optical data and second optical data include at least one of a depth image of an environment surrounding the autonomous compute device, a depth of the object relative to the autonomous compute device, and a direction angle of the object relative to the autonomous compute device.

Example 18 includes the subject matter of any of Examples 15-17, and wherein moving to the second location comprises moving the autonomous compute device in a direction of a course angle of autonomous compute device, the course angle is indicative of a direction of a movement of the autonomous compute device.

Example 19 includes the subject matter of any of Examples 15-18, and further including determining, by the autonomous compute device, the first location of the autonomous compute device based on a depth image of the environment surrounding the autonomous compute device generated by the optical communication system.

Example 20 includes the subject matter of any of Examples 15-19, and further including determining, by the autonomous compute device, the first location of the autonomous compute device based on location sensor data received from one or more location sensors.

Example 21 includes the subject matter of any of Examples 15-20, and further including determining, by the autonomous compute device, the second location of the autonomous compute device based on a depth image of the environment surrounding the autonomous compute device generated by the optical communication system.

Example 22 includes the subject matter of any of Examples 15-21, and further including determining, by the autonomous compute device, the second location of the autonomous compute device based on location sensor data received from one or more location sensors.

Example 23 includes the subject matter of any of Examples 15-22, and wherein determining whether the object is at the predicted second relative position comprises determining a difference between the first relative position and the second relative position of the object; and determining whether the difference is within a reference threshold.

Example 24 includes the subject matter of any of Examples 15-23, and further including performing at least one error analysis to ensure that the object has moved.

Example 25 includes the subject matter of any of Examples 15-24, and wherein performing the at least one error analysis comprises determining whether a second object is near the predicted second relative position based on the second optical data.

Example 26 includes the subject matter of any of Examples 15-25, and wherein performing the at least one error analysis comprises capturing third optical data while the autonomous compute device is at a third location; determining a predicted third relative position of the object relative to the autonomous compute device at the third location; and determining whether the object is at the third relative position based on the third optical data.

Example 27 includes the subject matter of any of Examples 15-26, and further including determining at least one movement characteristic of the object based on one or more the relative positions of the object over a predefined time period.

Example 28 includes the subject matter of any of Examples 15-27, and wherein the movement characteristic includes a speed at which the object is moving, a period indicating how long the object has been moving or moved, a frequency of the movement, a direction of the movement.

Example 29 includes one or more computer-readable media comprising a plurality of instructions stored thereon that, when executed, causes a compute device to perform the method of any of Examples 15-28.

Example 30 includes an autonomous compute device to monitor a movement of an object, the autonomous compute device comprising means for capturing, by an optical communication system of the autonomous compute device, first optical data while the autonomous compute device is at a first location; means for determining a first relative position of an object relative to the autonomous compute device at the first location based on the first optical data; means for moving to a second location different from the first location; means for capturing, by the optical communication system of the autonomous compute device, second optical data while the autonomous compute device is at the second location; means for determining a predicted second relative position of the object relative to the autonomous compute device at the second location; and means for determining whether the object is at the predicted second relative position based on the second optical data.

Example 31 includes the subject matter of Example 30, and wherein the optical communication system is a light detection and ranging (LIDAR) system.

Example 32 includes the subject matter of any of Examples 30 and 31, and wherein the first optical data and second optical data include at least one of a depth image of an environment surrounding the autonomous compute device, a depth of the object relative to the autonomous compute device, and a direction angle of the object relative to the autonomous compute device.

Example 33 includes the subject matter of any of Examples 30-32, and wherein the means for moving to the second location comprises means for moving the autonomous compute device in a direction of a course angle of autonomous compute device, the course angle is indicative of a direction of a movement of the autonomous compute device.

Example 34 includes the subject matter of any of Examples 30-33; and further including means for determining the first location of the autonomous compute device based on a depth image of the environment surrounding the autonomous compute device generated by the optical communication system.

Example 35 includes the subject matter of any of Examples 30-34, and further including means for determining the first location of the autonomous compute device based on location sensor data received from one or more location sensors.

Example 36 includes the subject matter of any of Examples 30-35, and further including means for determining the second location of the autonomous compute device based on a depth image of the environment surrounding the autonomous compute device generated by the optical communication system.

Example 37 includes the subject matter of any of Examples 30-36, and further including means for determining the second location of the autonomous compute device based on location sensor data received from one or more location sensors.

Example 38 includes the subject matter of any of Examples 30-37, and wherein the means for determining whether the object is at the predicted second relative position comprises means for determining a difference between the first relative position and the second relative position of the object; and means for determining whether the difference is within a reference threshold.

Example 39 includes the subject matter of any of Examples 30-38, and further including means for performing at least one error analysis to ensure that the object has moved.

Example 40 includes the subject matter of any of Examples 30-39, and wherein the means for performing the at least one error analysis comprises means for determining whether a second object is near the predicted second relative position based on the second optical data.

Example 41 includes the subject matter of any of Examples 30-40, and wherein the means for performing the at least one error analysis comprises means for capturing third optical data while the autonomous compute device is at a third location; means for determining a predicted third relative position of the object relative to the autonomous compute device at the third location; and means for determining whether the object is at the third relative position based on the third optical data.

Example 42 includes the subject matter of any of Examples 30-41, and further including means for determining at least one movement characteristic of the object based on one or more the relative positions of the object over a predefined time period.

Example 43 includes the subject matter of any of Examples 30-42, and wherein the movement characteristic includes a speed at which the object is moving, a period indicating how long the object has been moving or moved, a frequency of the movement, a direction of the movement.

The invention claimed is:
1. An autonomous compute device to monitor a movement of an object, the autonomous compute device comprising:
an optical communication system to capture first optical data while the autonomous compute device is at a first location and second optical data while the autonomous compute device is at a second location different from the first location;

a movement manager to move the autonomous compute device from the first location to the second location; and an object analyzer to:
determine a first relative position of the object relative to the autonomous compute device at the first location based on the first optical data;
determine a predicted second relative position of the object relative to the autonomous compute device at the second location;
determine whether the object is at the predicted second relative position based on the second optical data; and
perform at least one error analysis to ensure that the object has moved.

2. The autonomous compute device of claim 1, wherein the optical communication system is a light detection and ranging (LIDAR) system.

3. The autonomous compute device of claim 1, further comprising an autonomous compute device location determiner to determine the second location of the autonomous compute device based on location sensor data received from one or more location sensors.

4. The autonomous compute device of claim 1, wherein to determine whether the object is at the predicted second relative position comprises to:
determine a difference between the first relative position and the second relative position of the object; and
determine whether the difference is within a reference threshold.

5. The autonomous compute device of claim 1, wherein to perform the at least one error analysis comprises to determine whether a second object is near the predicted second relative position based on the second optical data.

6. The autonomous compute device of claim 1, wherein to perform the at least one error analysis comprises to:
capture third optical data while the autonomous compute device is at a third location;
determine a predicted third relative position of the object relative to the autonomous compute device at the third location; and
determine whether the object is at the third relative position based on the third optical data.

7. The autonomous compute device of claim 1, wherein the autonomous compute device is further to determine at least one movement characteristic of the object based on one or more the relative positions of the object over a predefined time period.

8. The autonomous compute device of claim 7, wherein the movement characteristic includes a speed at which the object is moving, a period indicating how long the object has been moving or moved, a frequency of the movement, or a direction of the movement.

9. A method for monitoring a movement of an object with an autonomous compute device, the method comprising:
capturing, by an optical communication system of the autonomous compute device, first optical data while the autonomous compute device is at a first location;
determining, by the autonomous compute device, a first relative position of the object relative to the autonomous compute device at the first location based on the first optical data;
moving, by the autonomous compute device, to a second location different from the first location;
capturing, by the optical communication system of the autonomous compute device, second optical data while the autonomous compute device is at the second location;
determining, by the autonomous compute device, a predicted second relative position of the object relative to the autonomous compute device at the second location;
determining, by the autonomous compute device, whether the object is at the predicted second relative position based on the second optical data; and
performing, by the autonomous compute device, at least one error analysis to ensure that the object has moved.

10. The method of claim 9, wherein the optical communication system is a light detection and ranging (LIDAR) system.

11. The method of claim 9, further comprising determining, by the autonomous compute device, the second location of the autonomous compute device based on location sensor data received from one or more location sensors.

12. The method of claim 9, wherein determining whether the object is at the predicted second relative position comprises:
determining a difference between the first relative position and the second relative position of the object; and
determining whether the difference is within a reference threshold.

13. The method of claim 9, wherein performing the at least one error analysis comprises determining whether a second object is near the predicted second relative position based on the second optical data.

14. The method of claim 9, wherein performing the at least one error analysis comprises:
capturing third optical data while the autonomous compute device is at a third location;
determining a predicted third relative position of the object relative to the autonomous compute device at the third location; and
determining whether the object is at the third relative position based on the third optical data.

15. The method of claim 9, further comprising determining at least one movement characteristic of the object based on one or more the relative positions of the object over a predefined time period.

16. One or more non-transitory computer-readable media comprising a plurality of instructions stored thereon that, when executed, causes an autonomous compute device to:
capture first optical data while the autonomous compute device is at a first location;
determine a first relative position of an object relative to the autonomous compute device at the first location based on the first optical data;
move the autonomous compute device from the first location to a second location different from the first location;
capture second optical data while the autonomous compute device is at a second location;
determine a predicted second relative position of the object relative to the autonomous compute device at the second location;
determine whether the object is at the predicted second relative position based on the second optical data; and
perform at least one error analysis to ensure that the object has moved.

17. The one or more non-transitory computer-readable media of claim 16, wherein the optical communication system is a light detection and ranging (LIDAR) system.

18. The one or more non-transitory computer-readable media of claim 16, wherein the plurality of instructions further causes the autonomous compute device to determine the second location of the autonomous compute device based on location sensor data received from one or more location sensors.

19. The one or more non-transitory computer-readable media of claim 16, wherein to determine whether the object is at the predicted second relative position comprises to:
   determine a difference between the first relative position and the second relative position of the object; and
   determine whether the difference is within a reference threshold.

20. The one or more non-transitory computer-readable media of claim 16, wherein to perform the at least one error analysis comprises to determine whether a second object is near the predicted second relative position based on the second optical data.

21. The one or more non-transitory computer-readable media of claim 16, wherein to perform the at least one error analysis comprises to:
   capture third optical data while the autonomous compute device is at a third location;
   determine a predicted third relative position of the object relative to the autonomous compute device at the third location; and
   determine whether the object is at the third relative position based on the third optical data.

22. The one or more non-transitory computer-readable media of claim 16, wherein the plurality of instructions further causes the autonomous compute device to determine at least one movement characteristic of the object based on one or more the relative positions of the object over a predefined time period.

* * * * *